United States Patent [19]

Kunishi et al.

[11] Patent Number: 5,563,645
[45] Date of Patent: Oct. 8, 1996

[54] ELECTROPHOTOGRAPHIC IMAGE FORMING METHOD OF DIGITAL TYPE HAVING AUTOMATIC IMAGE QUALITY SETTING MECHANISM

[75] Inventors: Tsuyoshi Kunishi; Nobumasa Fukuzawa, both of Yokohama; Hiroyuki Ichikawa, Kawasaki, all of Japan

[73] Assignee: Canon Kabushiki Kaisha, Tokyo, Japan

[21] Appl. No.: 65,499

[22] Filed: May 24, 1993

[30] Foreign Application Priority Data

May 28, 1992 [JP] Japan ..................................... 4-164333

[51] Int. Cl.⁶ .............................. G01D 15/06; H04N 1/21
[52] U.S. Cl. ........................... 347/112; 347/131; 358/298
[58] Field of Search ......................... 346/153.1; 358/462, 358/465, 458, 406, 448, 504, 519, 532, 298; 347/112, 131

[56] References Cited

U.S. PATENT DOCUMENTS

| | | | |
|---|---|---|---|
| 4,962,421 | 10/1990 | Murai .................. | 358/504 X |
| 4,965,679 | 10/1990 | Morton et al. ......... | 358/462 |
| 4,982,294 | 1/1991 | Morton et al. ......... | 358/465 |
| 4,992,804 | 2/1991 | Roe ..................... | 346/108 |
| 5,025,272 | 6/1991 | Haneda et al. ........ | 346/153.1 |
| 5,072,305 | 12/1991 | Numakura et al. .... | 358/298 |
| 5,144,686 | 9/1992 | Yumiba: Takashi et al. ........ | 358/447 |
| 5,270,827 | 12/1993 | Kobayashi et al. .... | 358/298 |
| 5,283,671 | 2/1994 | Stewart et al. ........ | 358/532 |
| 5,287,419 | 2/1994 | Sato et al. ............. | 358/458 X |
| 5,305,116 | 4/1994 | Kagami ................ | 358/448 |
| 5,313,308 | 5/1994 | Hasegawa et al. ..... | 358/406 |
| 5,313,313 | 5/1994 | Sato ..................... | 358/514 |
| 5,315,413 | 5/1994 | Yamamoto et al. .... | 358/512 |
| 5,327,257 | 7/1994 | Hrytzak et al. ........ | 358/448 X |

Primary Examiner—Brian W. Brown
Assistant Examiner—Randy W. Gibson
Attorney, Agent, or Firm—Fitzpatrick, Cella, Harper & Scinto

[57] ABSTRACT

The present invention relates to an electrophotographic technique for enhancing the quality of a reproduced image of character information and image information having an intermediate gradient.

A latent image forming means provides a plurality of preset γ-features and a plurality of sharpness features forsetting a resolving power of an image to be formed which can be selected optionally, and, in the latent image forming means, when a particular sharpness feature is set in response to a γ-feature selected from the aforementioned γ-features. In the reproduction of character image information, a γ-feature for enabling the image reproduction to enhance the edge effect is selected, thereby emphasizing the sharpness feature. Whereas, in the reproduction of the image information to reproduce an intermediate gradient, a γ-feature for enabling the reproduction of the intermediate gradient is selected, thereby weakening the sharpness feature.

3 Claims, 4 Drawing Sheets

ELECTROPHOTOGRAPHIC IMAGE FORMING METHOD OF DIGITAL TYPE HAVING AUTOMATIC IMAGE QUALITY SETTING MECHANISM

BACKGROUND OF THE INVENTION

1. Field of the Invention

The present invention relates to an image forming method for visualizing a digital image signal having numerous values, and, more particularly, it relates to an image forming method for forming an image, having a plural types of γ (gamma) features.

2. Related Background Art

Conventionally, it is known to use a copying machine of digital type for such image forming method. In the well-known fundamental construction of such a digital copying machine, the density distribution of an original is read by a reader portion comprising a lens, mirrors, an original illuminating lamp and a CCD, image information of the original is converted to a digital image signal having numerous values and various treatment are effected regarding the digital image signal, and then, the treated digital image signal is visualized by a printer portion comprising the combination of a laser scanner device including a laser, a polygon mirror and a laser modulating device, and a well-known electrophotographic device. That is to say, the digital copying machine of this type is constituted by the reader portion, an image signal treating portion and the printer portion.

One of the features of such image forming apparatus is a γ-feature. The γ-feature indicates a relation between the read density value of the original image and an output image density value outputted in correspondence to the density value. In the conventional digital copying machine, it is known to freely determine the γ-feature by a table converting treatment effected in the image signal treating portion (hereinafter, the treatment for freely determining the γ-feature is referred to as "γ converting treatment"). Among image forming apparatuses using such technique, there is a digital copying machine wherein an image signal treating portion has a plurality of γ converting functions to obtain the optimum image output in correspondence to a kind of original to be copied (for example, character original, network dot image original, silver salt photographic image or the like) and the γ-feature is selected in dependence upon the kind of original.

Generally, in case of the character original, by forming an image with using the non-linear γ-feature having the sharp building-up as shown in FIG. 3, it is possible to obtain an easily readable output image having high contrast by reproducing character lines having low density value with high density value. On the other hand, in case of the network dot image original and the silver salt photographic original, by forming an image with using the linear γ-feature as shown in FIG. 4, it is possible to obtain an output image having high gradient and good density value reproductivity.

Further, in the digital copying machine, it is also well known to effect the treatment for changing the sharpness of the image regarding the image signal at the image signal treating portion in order to eliminate the spatial quantization error of the CCD. The concrete means for changing the sharpness may be a method wherein, regarding the density value of each pixel in the image, new density value for each pixel is determined by adding a value obtained by multiplying the spatial secondary derivative value of the density distribution around the each pixel by a predetermined coefficient to the density value of each pixel (this method is referred to as "secondary derivative adding treatment" hereinafter). In the secondary derivative adding treatment, when the coefficient by which the secondary derivative value is multiplied is a large negative (minus) value, the sharpness is emphasized to clarify the image; whereas, when the coefficient is a large positive (plus) value, the sharpness is weakened to make the image out of focus. In the conventional digital copying machine, the secondary derivative adding treatment for emphasizing the sharpness in order to reproduce the character original having the high frequency of use as an easily readable sharp image was effected.

However, in the image forming apparatus having the above-mentioned image treating means, the following disadvantages occurred. That is to say, when the original image is formed gathering the periodical image pixels (such as the network dot image), the period of the network spots is interfered with the reading period (cycle) of the reader portion and/or the writing period of the printer portion, thereby creating the moire fringe pattern in the output image. Such moire fringe pattern is worsened as the periodicity of the reader portion and/or the writing periodicity of the printer portion are emphasized. Therefore, when the sharpness is emphasized, since the periodicity of the each pixel in the image is emphasized, the moire fringe pattern is worsened. Accordingly, in the conventional digital copying machine wherein the character image is mainly handled and which has the tendency for emphasizing the sharpness, when the network dot image original was copied, the strong moire fringe pattern was generated in the output image, and, thus, the good quality image could not be obtained.

Further, regarding the output image obtained by effecting the strong secondary derivative adding treatment with respect to the network dot image original, the density of the image could not be reproduced surely. That is to say, as mentioned above, the secondary derivative adding treatment is the treatment for changing the density value of each pixel. Particularly, in the vicinity of the small dot having the high density, since the secondary derivative value is great, the difference in the density value before treatment and the density value after treatment becomes great.

In FIG. 5, the image density distribution before treatment is shown by the solid line, and a value obtained by multiplying the secondary derivative value of the image density distribution by the predetermined minus coefficient is shown by the broken line. FIG. 6 shows the image density distribution (after treatment) obtained by effecting the secondary derivative adding treatment regarding the image density distribution before treatment. Since the network dot image is formed by gathering the great number of dots, it should be noted that the density value added to a unit area of the image becomes great.

In order to eliminate the drawbacks of the aforementioned conventional digital copying machine, there has been proposed a method wherein the density of the image pixels in an image forming means is switched between the case where an image is formed with the γ-feature for the character original and the case where an image is formed with the γ-feature for the network dot image original and the silver salt photographic original. For example, the image was formed with 400 dpi regarding the character original and with 133 dpi regarding the network image original and the silver salt photographic original. However, this conventional technique had a disadvantage that the resolving power of the output image was worsened in the network image original and the silver salt photographic original mode.

SUMMARY OF THE INVENTION

An object of the present invention is to provide an image forming method wherein an optimum image formation can be effected in accordance with the kind of images.

To achieve the above object, an electrophotographic image forming method of digital type having an automatic image quality setting mechanism according to the present invention comprises the steps of converting image information into diqital image information having numerous values to generate a digital image information signal having numerous values; exposing an electrophotographic photosensitive body by a digital optical system, forming an electrostatic latent image and visualizing the latent image; and setting an image quality in the step of forming the latent image; and is characterized in that a plurality of preset γ-features and a plurality of sharpness features for setting a resolving power of an image to be formed are prepared to be selected optionally, and a particular sharpness feature is selected on the basis of the γ-feature selected among the aforementioned γ-features.

DETAILED DESCRIPTION OF THE PREFERRED EMBODIMENTS

The present invention will now be explained in connection with embodiments thereof with reference to the accompanying drawings.

(First Embodiment):

In the first embodiment, an example that the present invention is carried out by a digital copying machine having the γ-feature for a character original shown in FIG. 3 and the γ-feature for a network dot image and a silver salt photographic original shown in FIG. 4 will be explained. Hereinafter, the γ-feature for the character original is referred to as "character emphasized or stressed type" and the γ-feature for the network dot image and the silver salt photographic original is referred to as "gradient emphasized or stressed type".

Figure 1:
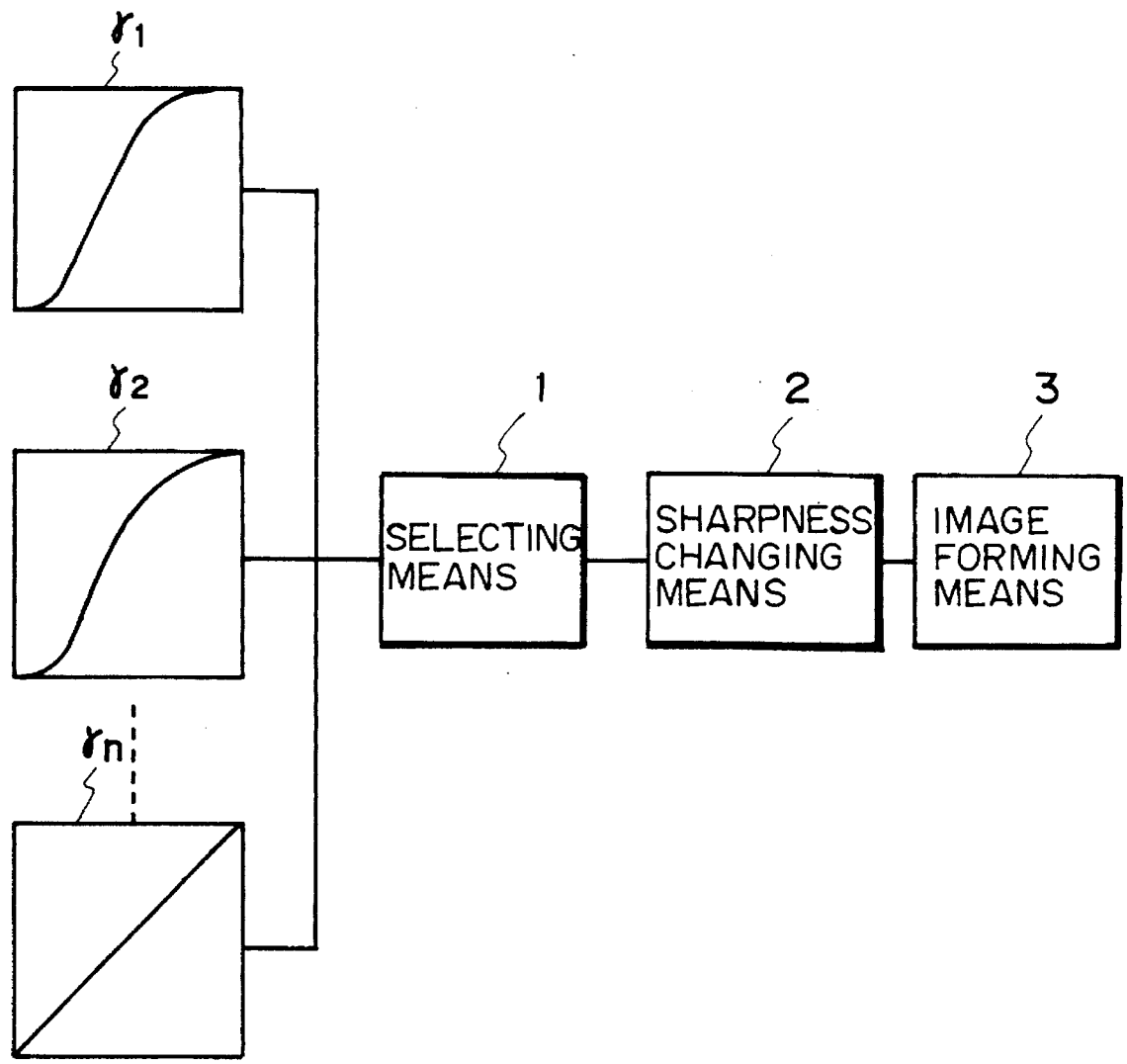
FIG. 1 is a block diagram showing a schematic construction of an image forming apparatus for carrying out an image forming method according to the present invention.

As shown in FIG. 1, the digital copying machine according to the first embodiment comprises a selecting means 1 for selecting a plurality of γ-features $\gamma_1, \gamma_2, \ldots \gamma_n$ having different properties, a sharpness changing means 2 for changing the sharpness in response to the selected γ-feature, and an image forming means for forming an image on the basis of these data.

Figure 2:
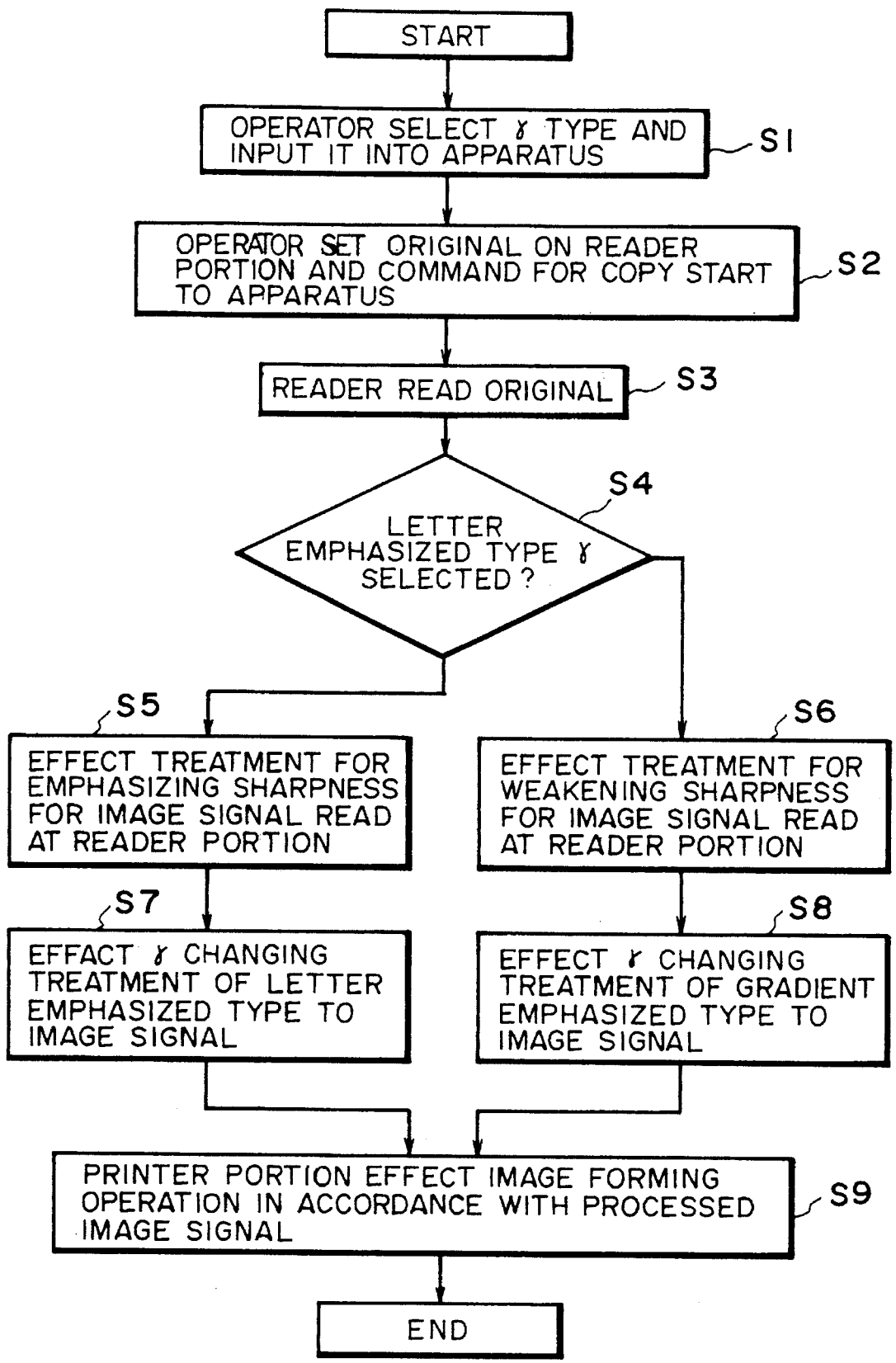
FIG. 2 is a fundamental flow chart showing an image forming operation of, the image forming apparatus of FIG. 1.

In such a digital copying machine, an operator selects the γ-feature of the character emphasized type or the γ-feature of the gradient emphasized type by pushing a button in accordance with the kind of original before an image forming operation is started. Thereafter, when a copy key for starting the image forming operation is depressed, the image forming operation is effected in accordance with the flow chart shown in FIG. 2 in response to the selected γ-feature. The flow chart of FIG. 2 shows the characteristic of the present invention. Now, the image forming operation and the effect according to the first embodiment will be fully explained with reference to this flow chart.

After the operator selects the γ-feature (γ-type) to be used (step S1), when the command for copy start is given to the copying machine (step S2), the image information on the original is read by a reader portion comprising a lens, mirrors, an original illuminating lamp and a CCD (step S3). Regardless of the selected γ-type, the image information is always converted into an image signal such that a signal value of each pixel indicates a density value by an integral number from 0 to 255 with the pixel density of 400 dpi×400 dpi. The image signal is treated (step S4) so as to change the sharpness in accordance with the kind of the previously inputted γ-type.

In the first embodiment, as a concrete means for changing the sharpness of the image signal, an operation (calculation) treating means for adding a value obtained by multiplying the spatial secondary derivative value of the signal value distribution around each pixel by a value determined for each γ-type to the signal value of each pixel will be explained.

First of all, the concrete contents of the operation treatment will be fully described. A position of the pixel which is disposed i-th in a longitudinal direction and j-th in a widthwise direction is indicated as (i, j) and the signal value of the pixel disposed at the position (i, j) is indicated as D (i, j). According to the difference approximation, it is well known that the secondary derivative value in the vicinity of the position (i, j) is proportional to D (i−1, j)+D (i+1, j)+D (i, j−1)+D (i, j+1). When the image signal value after the secondary derivative adding treatment is S (i, j) and a predetermined coefficient for determining the intensity of the sharpness is K, the signal value after treatment S (i, j) can be determined by the following equation:

$$S(i, j) = D(i, j) + K \cdot \{D(i-1, j) + D(i+1, j) + D(i, j-1) + D(i, j+1)\}$$

Thus, the sharpness is emphasized as the value of the coefficient K is negative and the absolute value thereof is increased; whereas, the sharpness is decreased as the value of the coefficient K is positive and the absolute value thereof is increased.

In the illustrated embodiment, when the γ-feature of the character emphasized type is selected the value of the coefficient K is −(4/32) and when the γ-feature of the gradient emphasized type is selected the value of the coefficient K is +(1/32). By effecting the secondary derivative adding treatment, the sharpness of the image is emphasized when the γ-feature of the character emphasized type is selected (step S5), and. the sharpness of the image is decreased when the γ-feature of the gradient emphasized type is selected (step S6). Regarding the image signal to which the treatment for changing the sharpness of the image in response to the selected γ-type in this way is added, the γ changing treatment is effected by the table converting treatment means and the like (steps S7 and S8). The γ changing treatment is the γ changing treatment corresponding to the previously selected γ-type. The image signal to which the sharpness changing treatment and the γ changing treatment are added is inputted to a printer portion. The printer portion comprising the combination of a laser scanner device including a laser, a polygon mirror and a laser modulating means and a well-known electrophotographic device performs the image formation in accordance with the treated image signal (step S9).

Figure 3:
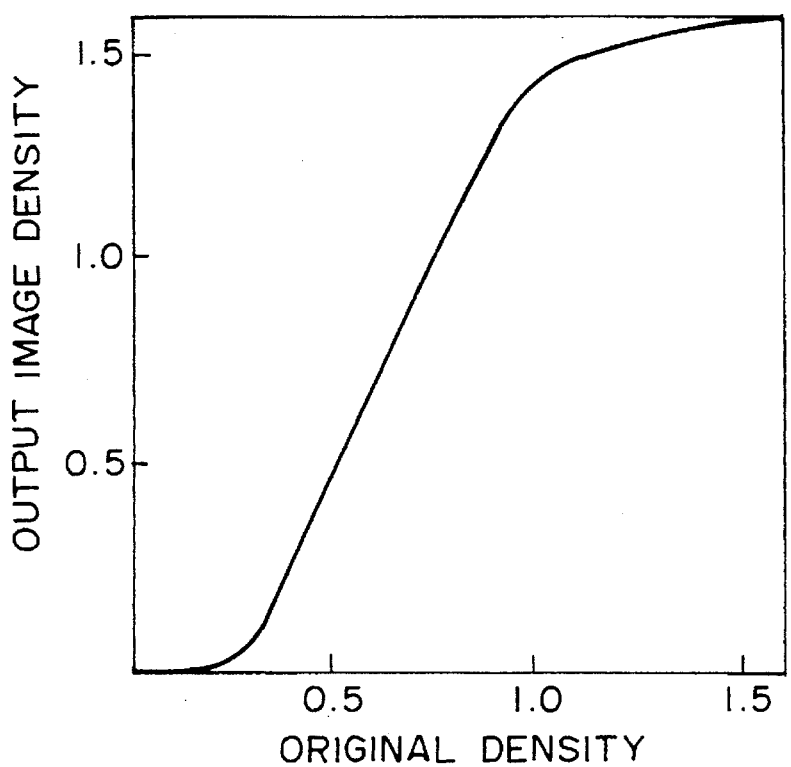
FIG. 3 is a graph showing a γ-feature for a character original.

According to the illustrated embodiment, in the character emphasized mode, since the image formation is performed with the γ-feature as shown in FIG. 3 at the same time when the sharpness is emphasized, even small characters can be reproduced sharply and even characters having low density (such as pencilled characters) can also be reproduced with high density.

Figure 4:
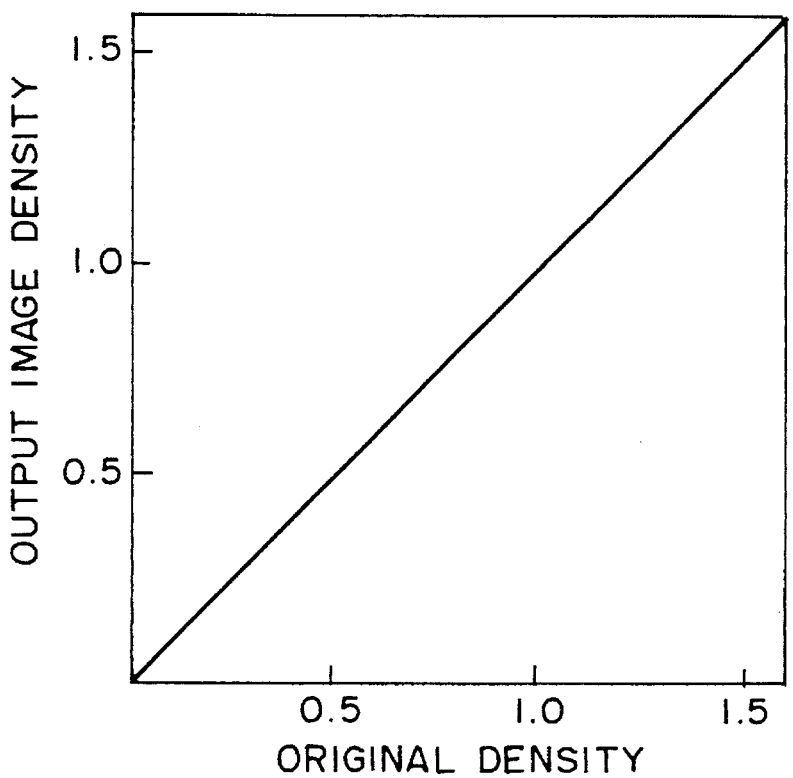
FIG. 4 is a graph showing a γ-feature for a network dot image and a silver salt photographic original.
Figure 5:
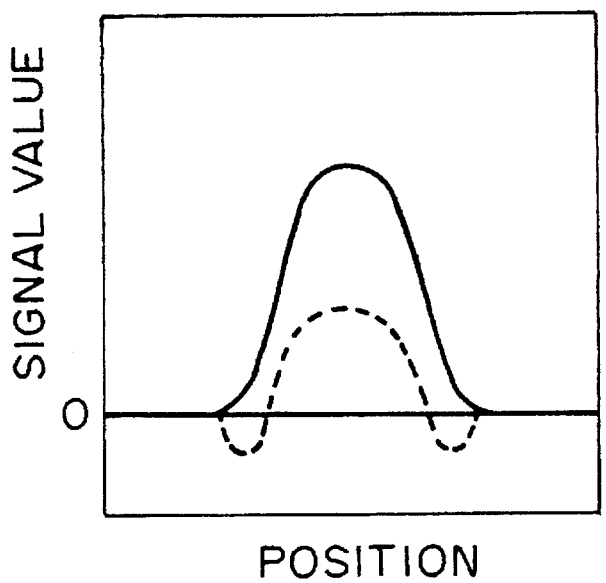
FIG. 5 is a graph showing an image signal before the secondary derivative adding treatment is effected, and the secondary derivative adding value.
Figure 6:
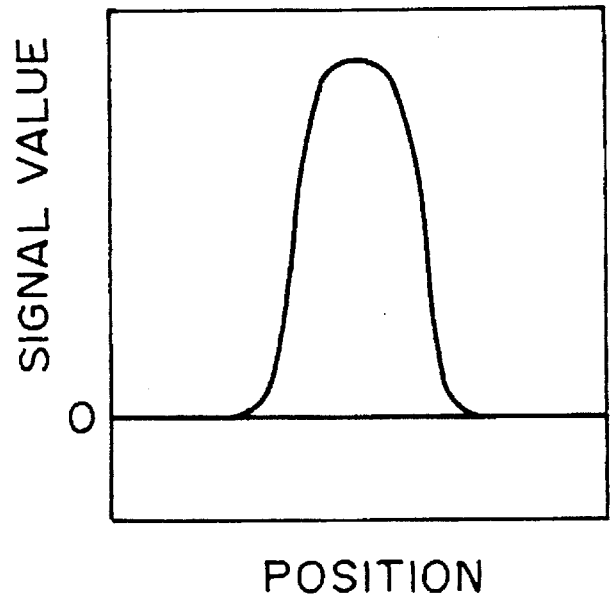
FIG. 6 is a graph showing an image signal after the secondary derivative adding treatment is effected.

On the other hand, in the gradient emphasized mode, since the image formation is performed with the γ-feature as shown in FIG. 4 at the same time when the sharpness is decreased, nevertheless the pixel density has the high resolving power of 400 dpi, the moire fringe pattern and the density change are not generated even in the network dot image and it is possible to reproduce the network dot image and the silver salt photographic original with the good gradient.

(Second Embodiment):

The means for changing the sharpness of the image is not limited to the secondary derivative adding treatment. In the second embodiment, an example that the sharpness is changed by another means will be explained.

The fundamental procedures from the selection of the γ-type by the operator to the treatment of the image signal and the image formation at the printer portion are performed in accordance with the flow chart of FIG. 2. Now, the concrete contents of a means for changing the sharpness will be described. It is assumed that the image signal value before the sharpness changing treatment is D (i, j) and the image signal value after the treatment is S (i, j). Further, it is assumed that the signal value of each pixel after treatment is indicated by an average value obtained by averaging the signal value of each pixel and a value provided by adding the predetermined weightening to the signal values of the pixels in the vicinity of each pixel. For example, the image signal value after treatment can be determined from the following equation:

$$S(i, j)=[D(i, j)+L\cdot\{D(i-1, j)+D(i+1, j)+D(i, j-1)+D(i, j+1)\}]\div(1+4\cdot L)$$

Where, L is a coefficient for the weightening. A value of L can be changed in a range $0 \leq L \leq 1$. When L=0, the sharpness does not change. The sharpness is decreased as the value L approaches 1. According to the second embodiment, in the character emphasized mode, the value L is set to zero, and, in the gradient emphasized mode, the value L is set to 1. In this condition, by effecting the average operation treatment, the sharpness of the image is changed.

(Third Embodiment):

The treatment for changing the sharpness may be the combination of the secondary derivative adding treatment and the average operation treatment. For example, in the character emphasized mode, the coefficient K is selected to $-(4/32)$ and the secondary derivative adding treatment is effected; on the other hand, in the gradient emphasized mode, the weightening coefficient L is selected to 1 and the average operation treatment is effected, thereby changing the sharpness.

(Fourth Embodiment):

In the above-mentioned embodiments, while the operator selected the γ-type, the γ-type may be selected by discriminating which type the original is on the basis of the image signal.

As mentioned above, according to this embodiment, by selecting one γ-feature among the plurality of γ-types in accordance with the usage and by automatically changing the sharpness of the image in accordance with the selected γ-type, for example, it is possible to perform the optimum image formation in accordance with the kind of the images such as the character image, network dot image or the like.

Incidentally, regarding the image forming means 3 in the aforementioned embodiments, the conventional electrophotographic image forming means wherein an electrophotographic photosensitive body is uniformly charged by corona discharge and then a latent image is formed on the photosensitive body by illuminating digital light corresponding to light information onto the photosensitive body and then the latent image is developed by a developing means with toner can be used as the image forming means 3. These means such as the charger means, exposure means and developing means may be conventional ones. In this specification, since these means may be conventional ones, the detailed explanation of these means will be omitted.

What is claimed is:

1. An image quality adjusting mechanism comprising:

storage means for storing a plurality of predetermined input-output image density characteristics;

selecting means for selecting at least one of the plurality of predetermined input-output image density characteristics; and sharpness changing means for changing a sharpness of an image;

wherein said sharpness changing means changes the sharpness of the image based on a selected input-output image density characteristic so that the sharpness of the image is decreased as the selected input-output image density characteristic becomes more linear.

2. An image quality adjusting mechanism according to claim 1, wherein said selecting means selects an input-output density characteristic which corresponds to data input by an operator.

3. An image quality adjusting mechanism according to claim 1, wherein said sharpness changing means changes a coefficient of a secondary derivative adding-treatment.

* * * * *